United States Patent
Yoshida

[11] Patent Number: 5,363,142
[45] Date of Patent: Nov. 8, 1994

[54] METHOD FOR CHANGING MICROCOMPUTER SPECIFICATIONS INSTALLED IN TV SETS FOR THE PURPOSE OF USING THE TV SETS IN DIFFERENT FOREIGN DESTINATIONS

[75] Inventor: Noboru Yoshida, Daito, Japan

[73] Assignee: Funai Electric Co., Ltd., Daito, Japan

[21] Appl. No.: 49,030

[22] Filed: Apr. 16, 1993

[30] Foreign Application Priority Data

Apr. 16, 1992 [JP] Japan .................. 4-124274

[51] Int. Cl.5 .............................................. H04N 5/46
[52] U.S. Cl. .............................. 348/554; 348/725
[58] Field of Search ............... 358/194.1, 191.1, 139, 358/140, 188; 348/86, 180, 725, 728, 730, 554; H04N 17/00, 17/04, 5/46

[56] References Cited
U.S. PATENT DOCUMENTS

| | | | |
|---|---|---|---|
| 4,635,121 | 1/1987 | Hoffman et al. | 358/188 |
| 4,858,006 | 8/1989 | Suzuki et al. | 358/139 |
| 5,065,240 | 11/1991 | Zuffada et al. | 358/188 X |
| 5,099,326 | 3/1992 | Hakamada et al. | 358/139 |
| 5,115,316 | 5/1992 | Gurley et al. | 358/188 |
| 5,124,804 | 6/1992 | Socarras | 348/554 |
| 5,157,495 | 10/1992 | Small | 358/188 |
| 5,191,423 | 3/1993 | Yoshida . | |

*Primary Examiner*—Mark R. Powell
*Assistant Examiner*—John W. Miller
*Attorney, Agent, or Firm*—Lackenbach Siegel Marzullo Aronson & Greenspan

[57] ABSTRACT

A method for selecting the proper program corresponding to respective destinations of TV sets from many programs store in a microcomputer installed in said TV set, is characterized in that, the destination code identifying the country of destination is transmitted together with power on code from the remote controller which is essentially provided with said TV set, and said microcomputer selects said proper program prepared for said destination by receiving said destination code transmitted from said remote controller.

6 Claims, 3 Drawing Sheets

METHOD FOR CHANGING MICROCOMPUTER SPECIFICATIONS INSTALLED IN TV SETS FOR THE PURPOSE OF USING THE TV SETS IN DIFFERENT FOREIGN DESTINATIONS

BACKGROUND OF THE INVENTION

The present invention relates to a method for selecting the proper program which initializes TV sets destined for foreign countries.

Up to the present, when shipping TV sets to different foreign destinations, it was customary to install in said TV sets a single microcomputer on which was stored many kinds of initializing programs, and to select the proper program corresponding to the specified destination for the purpose of using said TV sets in said destined country, without modifying said programs for every destination or making masks according to the functional grades of said TV sets.

In FIG. 3, a wiring diagram of the initializing system adopting the diode-jumping method attached to said computer is shown.

To select the proper program for specified individual destinations, by applying diodes D1–Dn shown in FIG. 3, said initializing systems were specified in advance as follows:

if diode D1 was present, said system corresponded to a channel plan for only the VHF system;

if diode D1 was not present, said system corresponded to a channel plan for VHF-L/VHF-H/VHF systems;

if diode D2 was present, said system corresponded to an audio multiplex responding system;

if diode D2 was not present, said system corresponded to an audio monolar response system;

if diode D3 was present, said system corresponded to a single AV inputting system; and if diode D3 was not present, said system corresponded to an AV-less system.

Accordingly, said microcomputer 10 sets said TV set at "power on", then detects the presence of said diodes in said diode-jumping circuits by receiving key-in scanning input, finally determining the proper program for said specified destination.

However, in reference to said conventional method shown in FIG. 3, as said diodes D1-Dn in said diode-jumping circuits are not used except when initializing said TV set, costs were high and productivity low.

Furthermore, on the TV set production line, it was necessary to modify the production method according to the presence of said diodes D1–Dn, owing to the differences in destinations and the following considerations. Namely, datacontrol is troublesome owing to the different number of required parts and it is necessary to modify the programs controlling the inserting machines provided on said production lines, to change jigs and tools such as in-circuit testers used on said line, and to install I/O ports for said microcomputer 10 installed in said TV sets for connecting said required diodes thereto.

The present invention was developed in consideration of the above drawbacks inherent in the conventional art, and its object is to provide a method for changing microcomputer specifications installed in said TV sets for selecting the proper program which initializes said TV sets destined for particular countries by transmitting "power on" data from the remote controller, without said diode circuit having to adopt said diode-jumping method.

At present, as TV sets destined for Europe are overwhelmingly of the type controlled only by said remote controller and having no "power on" switch, said changing method is much more effective.

SUMMARY OF THE INVENTION

In order to attain the object of the present invention, the method for selecting the proper program corresponding to respective destinations from many programs stored in a microcomputer installed in TV sets is characterized in that a [DESTINATION CODE], identifying the country of destination is transmitted together with a [POWER ON CODE] from the "power on" key of the remote controller which is essentially provided with said TV set, and said microcomputer selects the program for said destination by receiving said [DESTINATION CODE] transmitted from said remote controller.

By applying the above-mentioned construction, said remote controller transmits said [DESTINATION CODE] together with said [POWER ON CODE] towards said TV set, and said microcomputer, receiving said transmission, distinguishes said [DESTINATION CODE] and selects the proper program corresponding to said [DESTINATION CODE] from said programs stored therein. Said TV set is then initialized so as to be usable in said respective destination countries.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Preferred embodiments according to the present invention are described in detail with reference to the drawings as follows.

Figure 1:
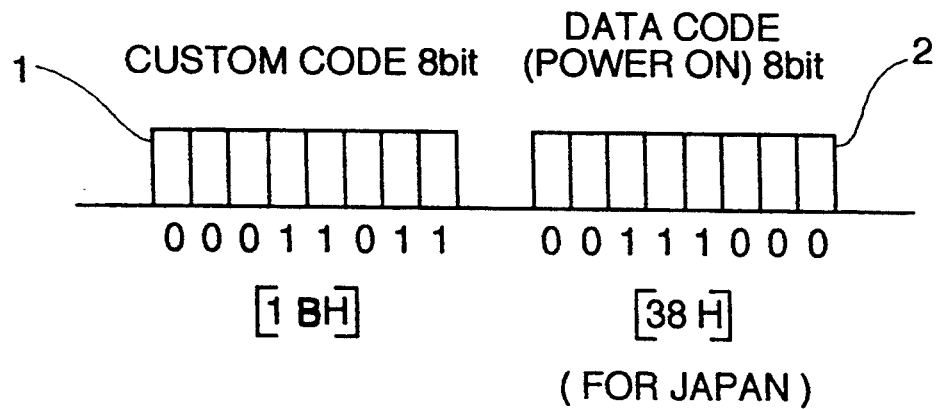
FIG. 1 shows a sample of transmitted data from the remote controller applying an embodiment according to this invention.

FIG. 1 shows sample data transmitted from the remote controller applying the first embodiment according to the present invention. The "power on" code transmitted from the remote controller for starting the TV set is composed of an 8-bit custom code 1 and an 8-bit data code 2 for starting said TV set.

With reference to said "power on" data code 2, the upper 4 digits form the "power on" signal and the lower 4 digits form the identifying signal for the various destinations.

The data code 2 is also displayed with a hexadecimal code. Therefore, TV sets destined for Japan specify [38H]→[00111000], TV sets destined for the U.S.A. specify [39H]→[00111001], and TV sets destined for Europe specify [3AH]→[00111010].

Accordingly, when said microcomputer installed in each of said TV sets receives said data code 2 transmitted from said remote controller, it identifies said destination code together with turning on said TV set power. If said destination code is [38H], said computer identifies it as destined for Japan, and selects the program for Japan from programs stored within itself, performing necessary preparations such as channelsetting according to the program data such as NTSC system VHF.

If said destination code is [3AH], said computer identifies it as destined for Europe, and selects the program for Europe from programs stored within itself, performing any necessary preparations such as band and channel setting or circuit selection according to the programs used in Europe, such as SECAM/PAL, VHF-L/VHF systems.

Figure 2:
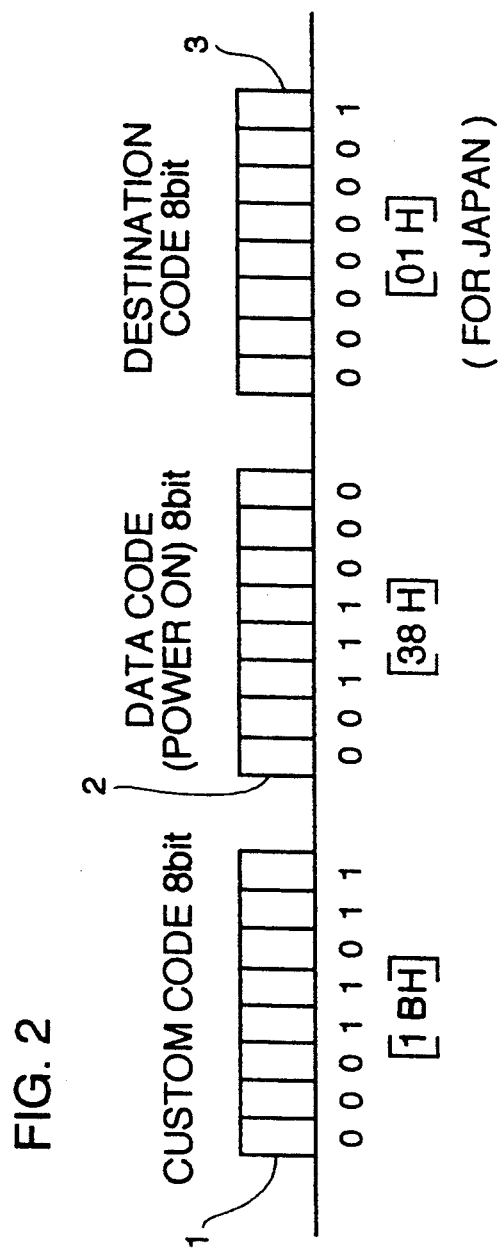
FIG. 2 shows a sample of data transmitted from the remote controller applying another embodiment according to this invention.
Figure 3:
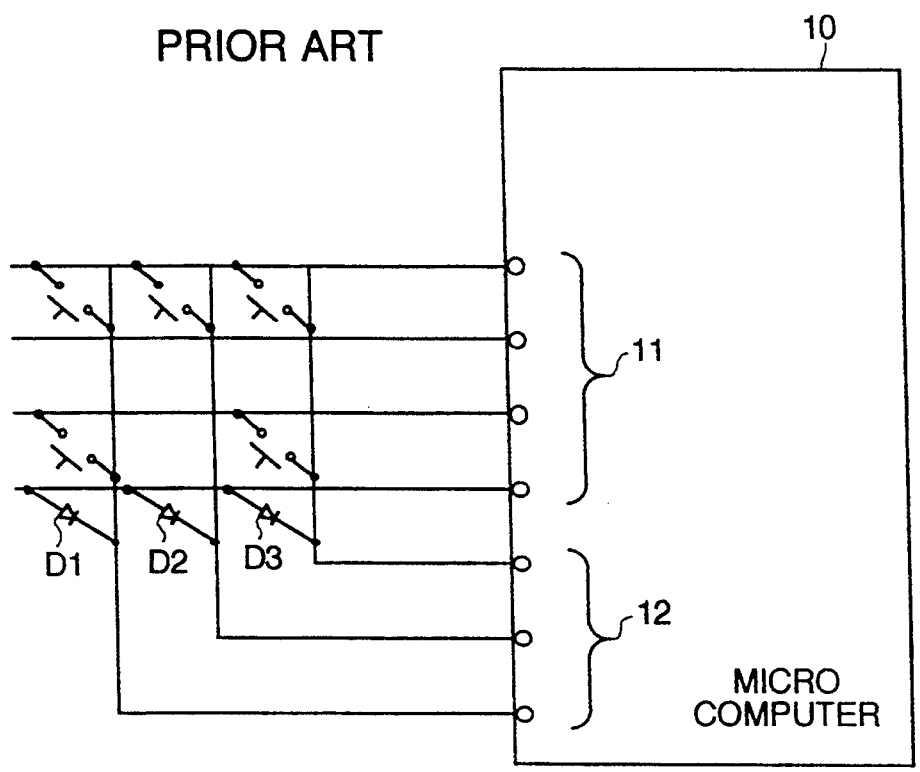
FIG. 3 shows a wiring diagram of the initialization setting system adopting the diode-jumping method.
Explanation of Reference Numbers
1 custom code
2 data code
3 destination code

Next, FIG. 2 shows sample data transmitted from the remote controller applying the second embodiment according to the present invention.

In this second embodiment, said transmission data are comprised with the hexadecimal 8-bit custom code 1, the hexadecimal 8-bit "power on" data code 2, and the hexadecimal 8-bit destination code 3. In this embodiment, said "power on" data code 2 is formed with [38H] which is usable throughout the world, and said destination code 3 is formed for identifying each country of destination.

In the same manner, TV sets that are destined for the U.S.A. are coded [02H]→[00000010], and TV sets destined for Europe are coded [03H]→[00000011]. For example, if said microcomputer receives [1BH], [38H], [01H] from said remote controller, it identifies said codes, then performs preparations for initializing said TV sets such as specifying the channel for Japan together with starting said TV sets.

In these embodiments, by transmitting said destination code together with the "power on" code from said remote controller essentially provided with said TV set, said microcomputer installed in said TV set identifies said destination code, and initializes said TV set so that it is able to receive TV broadcasts in said country of destination.

As detailed above, according to the present invention, as said remote controller transmits a destination code together with a "power on" code, said microcomputer identifies said destination code and selects a proper program corresponding to said destination code from programs stored therein and finally initializes said TV set by said selected program. It then become possible to reduce the number of unnecessary parts and to realize a reduction in costs, as well as to increase productivity on the production line.

What is claimed is:

1. A method of changing microcomputer specifications in television sets comprising the steps of storing a plurality of programs in the microcomputer each of which can be used to provide the television set at least one instruction for a predetermined mode of operation; and selecting a desired one of said plurality of programs upon receipt of a predetermined destination code which is recognized by the microcomputer as specifying said selected program; and executing said selected program upon receipt of said predetermined destination code to cause the television set to implement a desired mode of operation, wherein the plurality of programs each implement a power-on mode which initializes the television set on reception of said predetermined destination code to receive television signals in accordance with a predetermined television transmission system.

2. A method as defined in claim 1, further comprising the step of transmitting said predetermined code to the television set.

3. A method as defined in claim 1, wherein said predetermined code is transmitted as a hexidecimal code.

4. A method as defined in claim 1, wherein said predetermined code comprises an 8 bit signal.

5. A method as defined in claim 4, wherein the four least significant bits (LSB) of the 8 bit signal specify the program.

6. A method as defined in claim 4, wherein the four most significant bits (MSB) of the 8 bit signal control the power-on of the television set.

* * * * *